(12) United States Patent
Chen et al.

(10) Patent No.: US 10,871,628 B2
(45) Date of Patent: Dec. 22, 2020

(54) CAMERA MULTI-LENS MOUNT FOR ASSISTED-DRIVING VEHICLE

(71) Applicant: Pony AI, Inc., Grand Cayman (KY)

(72) Inventors: Kai Chen, San Jose, CA (US); Zhenhao Pan, Sunnyvale, CA (US); Xiang Yu, Santa Clara, CA (US); Tiancheng Lou, Milpitas, CA (US); Jun Peng, Fremont, CA (US); Yiming Liu, San Jose, CA (US); Hao Song, Sunnyvale, CA (US); Jie Hou, San Francisco, CA (US); Zichao Qi, Mountain View, CA (US); Sinan Xiao, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 418 days.

(21) Appl. No.: 15/799,190

(22) Filed: Oct. 31, 2017

(65) Prior Publication Data

US 2019/0129129 A1    May 2, 2019

(51) Int. Cl.
| | |
|---|---|
| *G02B 7/09* | (2006.01) |
| *G02B 27/00* | (2006.01) |
| *G05D 1/02* | (2020.01) |
| *G02B 7/28* | (2006.01) |
| *H04N 5/225* | (2006.01) |
| *G02B 7/02* | (2006.01) |
| *H04N 5/217* | (2011.01) |

(52) U.S. Cl.
CPC .............. *G02B 7/09* (2013.01); *G02B 7/021* (2013.01); *G02B 7/28* (2013.01); *G02B 27/0006* (2013.01); *G05D 1/0231* (2013.01); *H04N 5/2171* (2013.01); *H04N 5/2254* (2013.01)

(58) Field of Classification Search
None
See application file for complete search history.

(56) References Cited

U.S. PATENT DOCUMENTS

| | | | |
|---|---|---|---|
| 9,014,966 B2 | 4/2015 | Taylor et al. | |
| 9,156,473 B2 | 10/2015 | Clarke et al. | |
| 2016/0223781 A1* | 8/2016 | Du | G02B 7/16 |
| 2017/0293198 A1* | 10/2017 | Kim | B60R 1/00 |
| 2017/0313288 A1* | 11/2017 | Tippy | B60R 11/04 |

FOREIGN PATENT DOCUMENTS

EP    3229458 A1 *  10/2017    ......... G06K 9/00798

* cited by examiner

*Primary Examiner* — David E Harvey
*Assistant Examiner* — Joseph Daniel A Towe
(74) *Attorney, Agent, or Firm* — Sheppard Mullin Richter & Hampton LLP

(57) ABSTRACT

A lens mount apparatus mountable on a vehicle and a method for controlling a lens mount apparatus are described. The lens mount apparatus includes a plurality of lenses concentrically arranged around a center, and the plurality of lenses include a first lens having a first focal length and a second lens having a second focal length that is shorter than the first focal length. The method includes positioning one of the plurality of lenses, such that one of the lenses that has a focal length suitable for capturing an object is used for image capturing.

20 Claims, 10 Drawing Sheets

CAMERA MULTI-LENS MOUNT FOR ASSISTED-DRIVING VEHICLE

BACKGROUND

Assisted-driving vehicles such as vehicles that autonomously operate with limited human inputs or without human inputs primarily rely on visual information based on image data obtained from imaging devices, such as cameras, to determine operations (e.g., turning, accelerating, and braking) to be taken. The visual information may include human-eye equivalent information such as color, shape, and depth (distance) of objects included in a field of view (FOV) of the imaging devices. In order to accurately identify the objects in the FOV and determine appropriate operations to be taken, which is a key for safe driving, each image captured by the imaging devices should be as sharp and clear as possible. To obtain sharp and clear images of objects, a focus of lens should be proper focal and the surface of the lens should be as clean as possible (i.e., with less contamination).

In the context of an imaging device mounted on an assisted-driving vehicle, a distance to an object to be taken care of (e.g., other vehicles, road signs, traffic signals, pedestrians, and so on) typically changes as the assisted-driving vehicle moves or as the object moves. For that reason, using a single fixed-focus lens may not work to keep following a single object with focus. One possible solution of the issue would be using a zoom lens (unit) instead of a fixed-focus lens (unit) for the imaging device, so that an object to be taken care of can be kept being followed with focus. Since a zoom lens (unit) can change a focal length, an object that moves relatively to the vehicle can be followed with focus by changing a zoom ratio of the zoom lens.

However, a zoom lens unit usually requires more lenses compared to the fixed focus lens unit, and therefore the lens unit may suffer weight and cost increase. Further, a zoom lens unit usually require more light to capture images (i.e., F number is larger), and therefore may require extra light, which may suffer weight and cost increase. Moreover, images obtained using a zoom lens unit tends to contain more aberration and distortion, and therefore quality of images may not be sufficient for the intended purpose. Also, when exact zooming (e.g., 8.1 mm, as compared to 8.0 mm which is in the design of the lens) is desired, such may not be achievable with a zoom lens system. However, for purpose of machine vision, 8 mm vs. 8.1 mm present a significant difference. Still further, zoom lenses in general generate worse images than equivalent fixed-lens systems, in terms of brightness, saturation, sharpness, and distortion etc.

Moreover, in the context of an imaging device mounted on an assisted-driving vehicle, various foreign materials such as oil, dust, raindrops, mud, bugs, and so on, may be attached to an exterior surface of the imaging device, while the vehicle runs. Such foreign materials may decrease quality of images captured by the imaging device, for example, by blurring the images or by causing dark spots on the images. Therefore, it is critical to obtain images of high quality with a continuous manner while an assisted-driving vehicle runs for more accurate image recognition and more proper determination in assisted driving.

SUMMARY

Described herein are a lens mount apparatus and a method for controlling a lens mount apparatus.

In one embodiment, the disclosure describes a lens mount apparatus that is mountable on a vehicle for capturing images for assisted-driving of the vehicle, including: a plurality of lenses concentrically arranged around a center; an actuator configured to cause one of the plurality of lenses to move to a position for capturing images at a time; and a lens cleaner disposed concentric with the plurality of lenses with respect to the center, and configured to clean a surface of at least one of the plurality of lenses that is positioned at the lens cleaner. The plurality of lenses include a first lens having a first focal length and a second lens having a second focal length that is shorter than the first focal length.

In some embodiments, the lens mount apparatus further includes an image sensor disposed at the position for capturing images, and configured to receive light incident thereon through said one of the plurality of lenses at the position for capturing images. In some embodiments, the lens mount apparatus further includes a controller configured to control the actuator to switch a lens positioned at the position for capturing images from the first lens to the second lens, as a relative distance of an object within an angle of view of the lens mount apparatus to the lens mount apparatus decreases. In some embodiments, the controller controls the actuator based at least on image data generated by the image sensor.

In some embodiments, the position for capturing images is located concentric with the plurality of lenses with respect to the center, and the actuator is configured to rotate the plurality of lenses around the center, such that said one of the plurality of lenses is at the position for capturing images. In some embodiments, the plurality of lenses further comprises a third lens having a third focal length that is shorter than the second focal length, and the first lens, the second lens, and the third lens are consecutively arranged in this order. In some embodiments, a plurality of subgroups of lenses, and each of the subgroups of lenses comprises the first lens, the second lens, and the third lens that are consecutively arranged in this order along a rotational direction.

In some embodiments, the position for capturing images is nonconcentric with the plurality of lenses, and the actuator is configured to move said one of the plurality of lenses to the position for capturing images off a concentric position.

In some embodiments, the lens mount apparatus further includes a lens stabilizer configured to restrict movement of said one of the plurality of lenses. In some embodiments, the lens stabilizer comprises a latch positioned to block movement of an element of the lens mount apparatus that is caused to move by the actuator.

In one embodiment, the disclosure describes a method of controlling one or more lens mount apparatuses mounted on an assisted-driving vehicle. Each of the one or more lens mount apparatuses includes a plurality of lenses concentrically arranged around a center, the plurality of lenses comprising a first lens having a first focal length and a second lens having a second focal length that is shorter than the first focal length; and an image sensor disposed at a position for capturing images to receive light incident thereon through one of the plurality of lenses positioned at the position for capturing images. The method comprises, with respect to each of the one or more lens mount apparatuses positioning the first lens at the position for capturing images, when an object within an angle of view of the lens mount apparatus is at a first distance from the lens mount apparatus; determining whether or not the object is predicted to be closer to the lens mount apparatus than the focal range of the first lens after a predetermined period of time; and upon determining that the object is predicted to be closer to the lens mount apparatus than the focal range of the first lens after the predetermined period of time, positioning the second lens at the position for image capturing in place of the first lens In some embodiments, the method further includes, with respect to at least one of the one or more lens mount apparatuses: when the second lens is at the position for image capturing, determining whether or not the object exits out of the angle of view of the lens mount apparatus; and upon determining that the object exits out of the angle of view of the lens mount apparatus, positioning a third lens included in the plurality of lenses that has a focal length shorter than the first lens is at the position for image capturing.

In some embodiments with respect to at least one of the one or more lens mount apparatuses, the position for capturing images is located concentric with the plurality of lenses, and said positioning the first lens at the position for capturing images comprises rotating the plurality of lenses around the center.

In some embodiments, the method further includes, with respect to said at least one of the one or more lens mount apparatuses: causing one of the plurality of lenses to be at a position for cleaning that is concentric with the plurality of lenses and is different from the position for capturing images, as the plurality of lenses rotate around the rotational axis; and cleaning said one of the plurality of lenses at the position for cleaning.

In some embodiments, with respect to at least one of the one or more lens mount apparatuses, the position for capturing images is nonconcentric with the plurality of lenses, and said positioning the first lens at the position for capturing images comprises moving said one of the plurality of lenses to the position for capturing images off a concentric position. In some embodiments, the method further includes, with respect to at least one of the one or more lens mount apparatuses, cleaning one or more of the plurality of lenses concentrically arranged around the center.

In some embodiments, the method further includes, with respect to at least one of the one or more lens mount apparatuses, restricting movement of the plurality of lenses such that one of the lenses is stably positioned at the position for capturing images.

In some embodiments, a plurality of the lens mount apparatuses are mounted on the assisted-driving vehicle, the rotating further comprising, and the method further includes, with respect to at least one of the plurality of the lens mount apparatuses: upon determining that the object is predicted to be closer to the lens mount apparatus than the focal range of the first lens after the predetermined period of time, determining whether or not the object is being image-captured by at least another one of the plurality of the lens mount apparatuses; and upon determining that the object is being image-captured by at least another one of the plurality of the lens mount apparatuses, positioning the second lens at the position for image capturing in place of the first lens. In some embodiments, the rotating further comprises, with respect to at least one of the plurality of the lens mount apparatuses, upon determining that the object is not being image-captured by said at least another one of the plurality of the lens mount apparatuses, postponing positioning of the second lens at the position for image capturing at least for a predetermined period of time.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
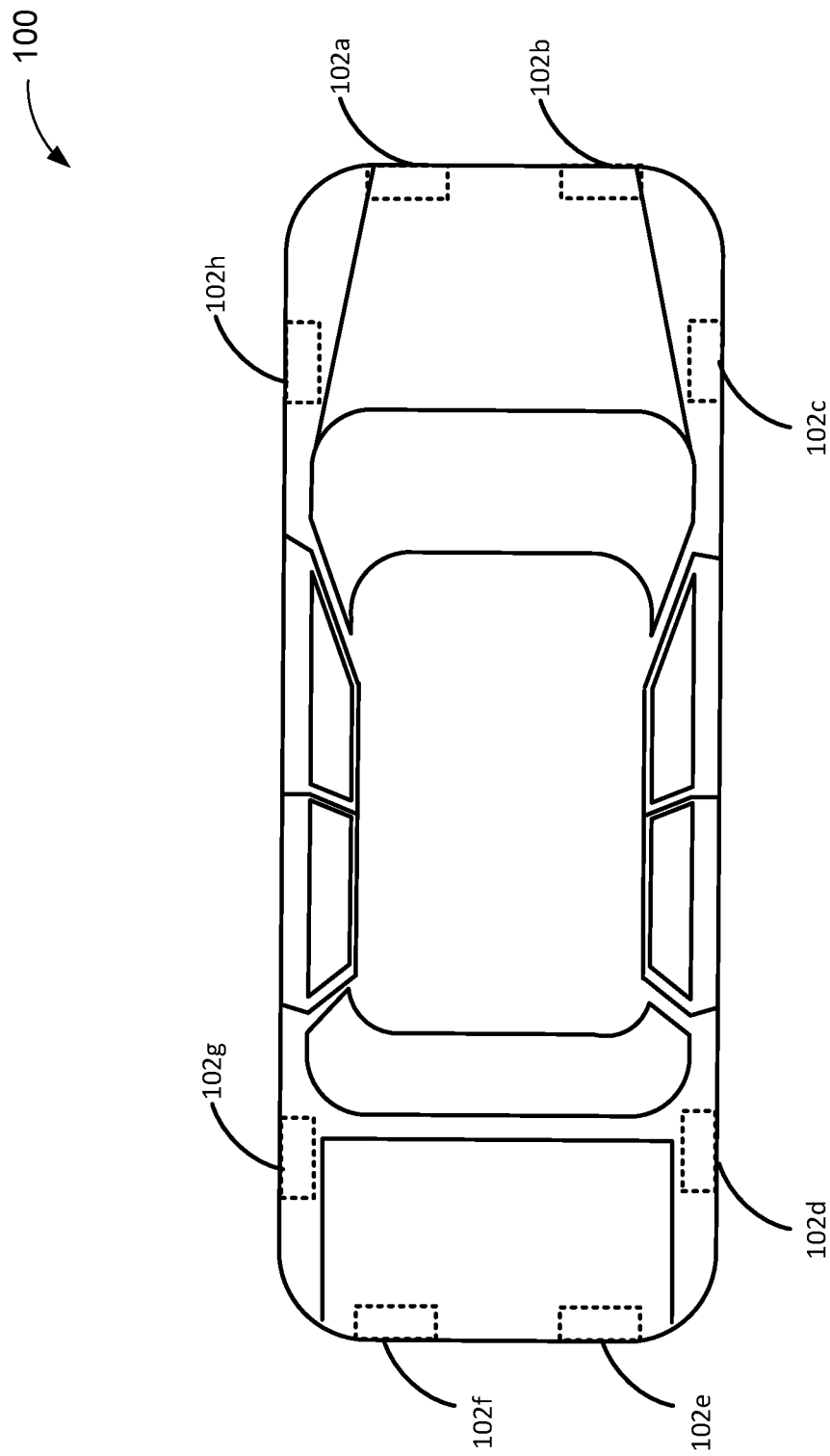
FIG. 1 is a schematic diagram depicting an example of an assisted-driving vehicle that includes a plurality of lens mount units according to an embodiment.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments described herein are directed to a lens mount apparatus for an assisted-driving vehicle and a method of controlling a lens mount apparatus mounted on an assisted-driving vehicle.

The lens mount apparatus for the assisted-driving vehicle includes a plurality of lenses concentrically arranged around a rotational axis. The plurality of lenses includes a first lens having a first focal length and a second lens having a second focal length that is shorter than the first focal length. The plurality of lenses of different focal lengths enables focusing of an object at different distances from the lens mount apparatus. For instance, as an object relatively approaches the assisted-driving vehicle while the vehicle or the object moves, one of the plurality of lenses that has a proper focal length can be positioned for image capturing by switching the plurality of lenses around the rotational axis. According to use of the lens mount apparatus, no zooming (i.e., lens shift in a lens axis direction) may be required.

The lens mount apparatus herein also includes a cleaner configured to clean a surface of one or more of the lenses. The cleaner is capable of maintaining the surfaces of the lenses to be clean or less foreign materials, and enable to capture images of higher quality.

The method of controlling the lens mount apparatus may include switching of lenses to obtain proper focus for image capturing of an object. That is, the method includes determining whether or not an object within an angle of view of the lens mount apparatus is predicted to be closer to the lens mount apparatus than the focal range of a current lens that is being used for image capturing after a predetermined period of time. When the object is predicted to move to a position closer to the lens mount apparatus, the method includes switching the current lens to another lens that has shorter focal length.

FIG. 1 is a schematic diagram depicting an example of an assisted-driving vehicle 100 that includes a plurality of lens mount units according to an embodiment. In the example depicted in FIG. 1, the assisted-driving vehicle 100 includes eight focus-variable lens mount units 102a-102g (hereinafter collectively referred to as focus-variable lens mount unit 102). An assisted-driving vehicle in the present disclosure is intended to represent a vehicle that is capable of sensing its environment and navigating with a limited human input or without human input. In one embodiment, the assisted-driving vehicle includes a vehicle that controls braking and/or acceleration without real time human input based on inputs from one or more of the lens mount units. In another embodiment, the assisted-driving includes a vehicle that controls steering without real time human input based on inputs from one or more lens mount units. In another embodiment, the assisted-driving includes a vehicle that autonomously controls braking, acceleration, and steering without real time human input specifically for parking the vehicle at a specific parking space, such as a parking lot, a curb side of a road (e.g., parallel parking), and a home garage, and so on. Further, "real time human input" is intended to represent a human input that is needed to concurrently control wheel movement of a non-assisted-driving vehicle, such as gear shifting, steering control, braking pedal control, accel pedal control, crutch pedal control, and so on. In one embodiment, the assisted-driving vehicle 100 is one of regular passenger vehicle types such as sedan, SUV, hatchback, and so on. In another embodiment, the assisted-driving vehicle 100 is one of commercial vehicle types such as bus, truck, trailer, and so on.

In the example of FIG. 1, the assisted-driving vehicle 100 is capable of sensing its environment based on inputs from one or more of the focus-variable lens mount units 102. More specifically, the assisted-driving vehicle 100 includes two lens mount units (front focus-variable lens mount units) 102a and 102b, two focus-variable lens mount units (right focus-variable lens mount units) 102c and 102d, two focus-variable lens mount units (rear focus-variable lens mount units) 102e and 102f, and two focus-variable lens mount units (left focus-variable lens mount units) 102g and 102h. Each of the focus-variable lens mount units 102 is configured to capture images, such as frame images, with a focus corresponding to a type of focus lens (e.g., fix-focus lens) that the focus-variable lens mount unit 102 uses. In a specific embodiment, each of the focus-variable lens mount units 102 includes a plurality of focus lenses (e.g., fix-focus lens) of which focal range is different from each other, such that images at an intended focal range can be captured. Here, "focal range" is intended to represent a range of distance from a focus-variable lens mount unit within which sharp images can be obtained. The mechanism to switch among the plurality of focus lenses is described below with reference to FIGS. 2A and 2B.

In the example of FIG. 1, the front focus-variable lens mount units 102a and 102b are mounted at suitable positions of a front portion of the assisted-driving vehicle 100. In one embodiment, the front focus-variable lens mount units 102a and 102b are mounted at positions corresponding to left and right front lights of the assisted-driving vehicle 100, respectively. Advantageously, the front focus-variable lens mount units 102a and 102b at the mounting positions corresponding to the front lights of the assisted-driving vehicle 100 are more likely to capture good-quality images when the driving is at night or in a dark place, such as an underground parking lot. The front focus-variable lens mount units 102a and 102b are capable of capturing images ahead of the assisted-driving vehicle 100 in a forward direction of the assisted-driving vehicle 100 (right direction in FIG. 1). Depending on a specific implementation of the invention, an image capturing direction (i.e., lens axis direction) of each of the front focus-variable lens mount units 102a and 102b may be fixed or variable. For example, the image capturing direction (i.e., lens axis direction) of each of the front focus-variable lens mount units 102a and 102b is fixed to a direction parallel to a longitudinal direction (i.e., transverse direction in FIG. 1) of the assisted-driving vehicle 100. In another embodiment, the image capturing direction (i.e., lens axis direction) of each of the focus-variable front lens mount units 102a and 102b is variable depending on a steering angle or a wheel direction. The mechanism to change the image capturing direction of the front focus-variable lens mount units 102a and 102b can employ any suitable mechanism that is known to one of ordinary skills in the art.

In the example of FIG. 1, the rear focus-variable lens mount units 102e and 102f are mounted at suitable positions of a rear portion of the assisted-driving vehicle 100. In one embodiment, the rear focus-variable lens mount units 102e and 102f are mounted at positions corresponding to right and left tail lights of the assisted-driving vehicle 100. The rear focus-variable lens mount units 102*a* and 102*b* are capable of capturing images ahead of the assisted-driving vehicle 100 in a reverse direction of the assisted-driving vehicle 100 (left direction in FIG. 1). Advantageously, the rear focus-variable lens mount units 102*e* and 102*f* are capable of providing images useful when the assisted-driving vehicle 100 drives in a reverse direction, such as when the assisted-driving vehicle 100 carries out a parking process. Similarly to the front focus-variable lens mount units 102*a* and 102*b*, each of the rear focus-variable lens mount units 102*e* and 102*f* may be fixed or variable.

In the example of FIG. 1, the right focus-variable lens mount units 102*c* and 102*d* are mounted at suitable positions of a right side of the assisted-driving vehicle 100. In one embodiment, the right focus-variable lens mount units 102*c* and 102*d* are mounted at positions corresponding to a right front wheel and a right rear wheel of the assisted-driving vehicle 100, respectively. Advantageously, the right focus-variable lens mount unit 102*c* is capable of capturing images of a right side of a road crossing a road at which the assisted-driving vehicle 100 is positioned, when the assisted-driving vehicle 100 proceeds in the forward direction. Similarly, the right focus-variable lens mount unit 102*d* is capable of capturing images of a right side of a road crossing the road at which the assisted-driving vehicle 100 is positioned, when the assisted-driving vehicle 100 proceeds in the reverse direction.

In the example of FIG. 1, the left focus-variable lens mount units 102*g* and 102*h* are mounted at suitable positions of a left side of the assisted-driving vehicle 100. In one embodiment, the left focus-variable lens mount units 102*g* and 102*h* are mounted at positions corresponding to a left rear wheel and a left front wheel of the assisted-driving vehicle 100, respectively. Advantageously, the left focus-variable lens mount unit 102*h* is capable of capturing images of a left side of a road crossing the road at which the assisted-driving vehicle 100 is positioned, when the assisted-driving vehicle 100 proceeds in the forward direction. Similarly, the left focus-variable lens mount unit 102*g* is capable of capturing images of a left side of a road crossing the road at which the assisted-driving vehicle 100 is positioned, when the assisted-driving vehicle 100 proceeds in the reverse direction.

In some embodiments, the number and the mounting positions of the focus-variable lens mount units 102 may be different from the example depicted in FIG. 1. For example, the total number of the focus-variable lens mount units 102 may be smaller or greater than eight. In another example, the number of the focus-variable lens mount units 102 on each side of the assisted-driving vehicle 100 may be smaller or greater than two. In more specific embodiment, the number (e.g., three) of the focus-variable lens mount units 102 on the front side of the assisted-driving vehicle 100 may be greater than the number (e.g., two) of the focus-variable lens mount units 102 on the other sides of the assisted-driving vehicle 100. Advantageously, such a configuration is capable of capturing more images on the front side of the assisted-driving vehicle 100, which require more images for assisted-driving when the assisted-driving vehicle 100 proceeds in the forward direction.

Figure 2A:
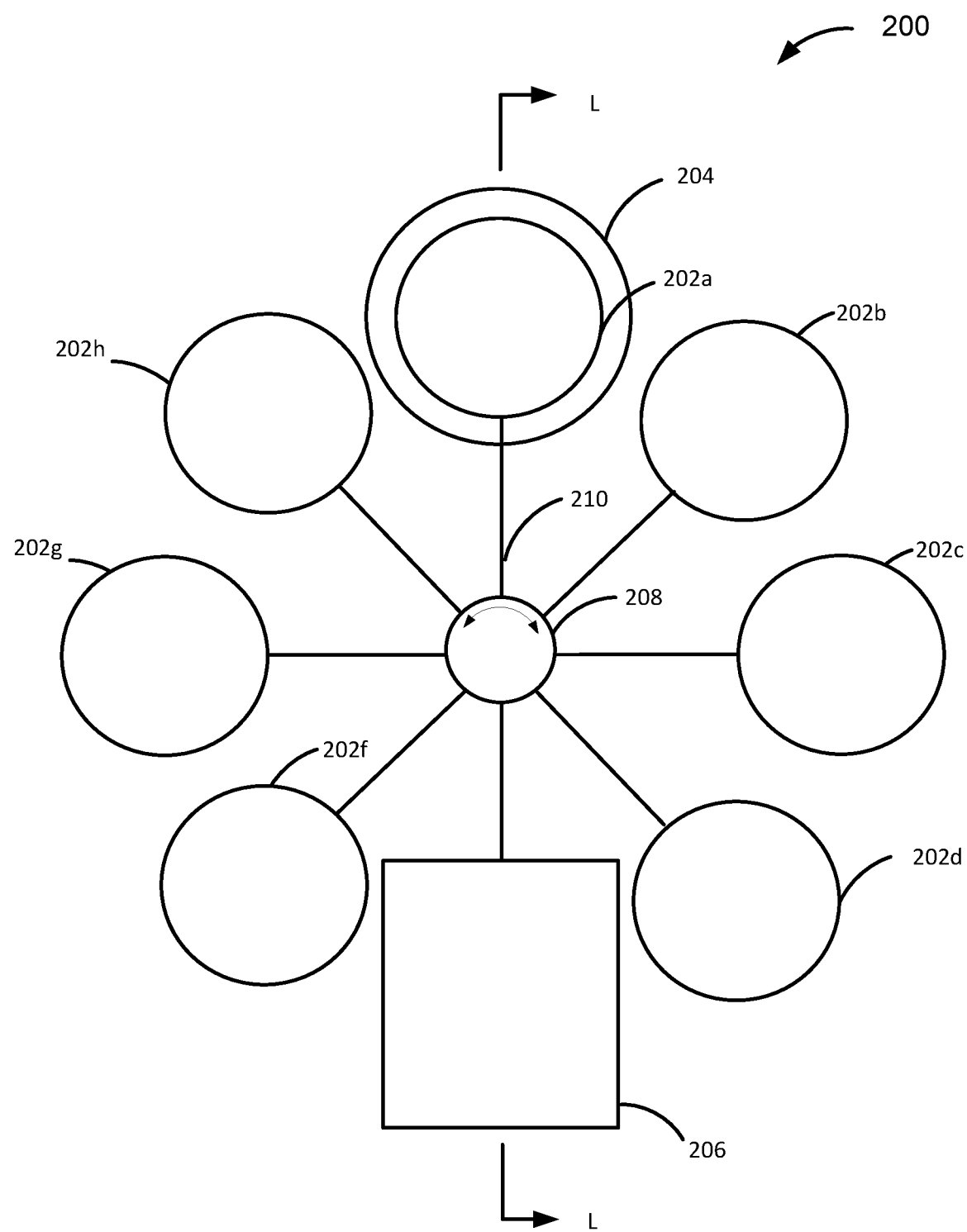
FIG. 2A is a schematic diagram depicting an example of a focus-variable lens mount unit in a direction parallel to lens axis directions of focus lenses included in the focus-variable lens mount unit according to an embodiment.
Figure 2B:
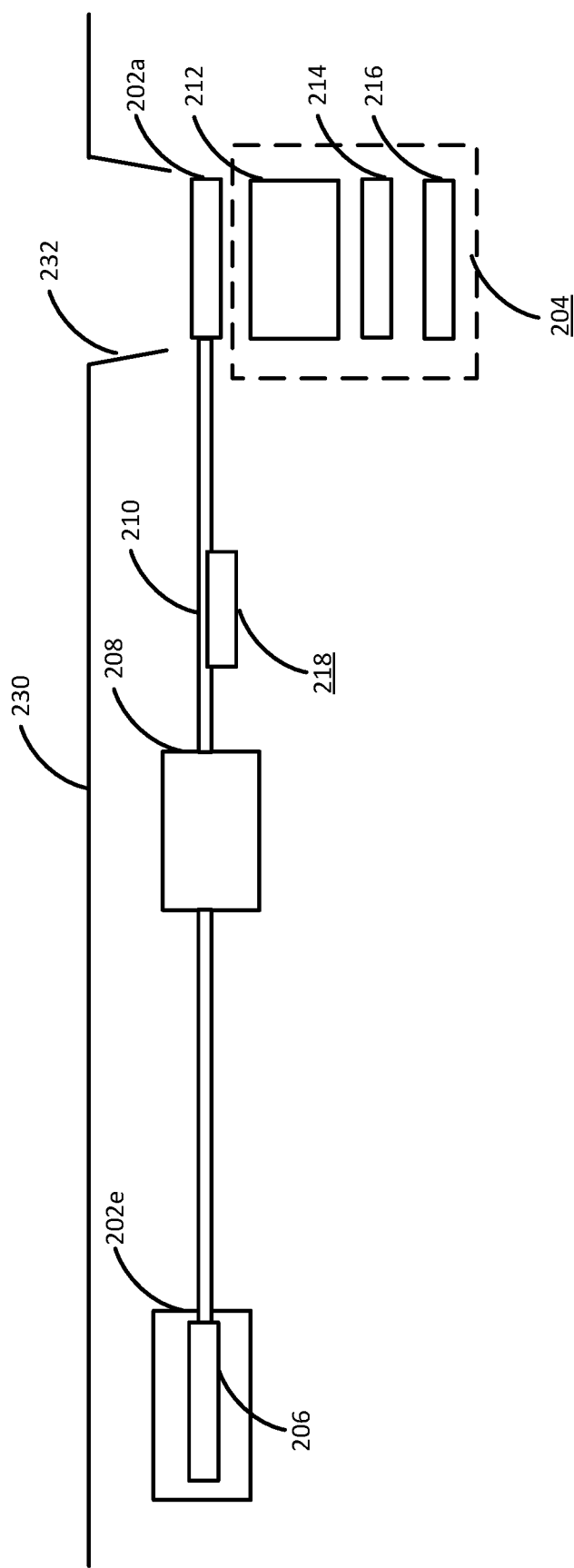
FIG. 2B is a schematic diagram depicting an example of the focus-variable lens mount unit taken along a line L-L depicted in FIG. 2A, in a direction perpendicular to the lens axis directions of the focus lenses.

FIG. 2A is a schematic diagram depicting an example of a focus-variable lens mount unit 200 in a direction parallel to lens axis directions of focus lenses included in the focus-variable lens mount unit 200 according to an embodiment. FIG. 2B is a schematic diagram depicting an example of the focus-variable lens mount unit 200 taken along a line L-L depicted in FIG. 2A, in a direction perpendicular to the lens axis directions of the focus lenses. The focus-variable lens mount unit 200 depicted in FIGS. 2A and 2B can correspond to one or more of the focus-variable lens mount units 102 depicted in FIG. 1. In the example depicted in FIG. 2A, the focus-variable lens mount unit 200 includes a plurality of focus lenses 202*a*-202*h* (hereinafter collectively referred to as focus lenses 202), a camera lens mount 204, a cleaning box 206, a motor 208, and eight shafts 210. In FIG. 2A, a focus lens 202*e* (see FIG. 2B) which is a focus lens disposed between the focus lens 202*d* and the focus lens 202*f*, is not shown, because the focus lens 202*e* is accommodated within the cleaning box 206.

In the example depicted in FIGS. 2A and 2B, the focus lenses 202 are concentrically arranged around a rotational axis, at which a motor 208 is positioned, and each of the focus lenses 202 is connected to the motor 208 via a corresponding one of the shafts 210. The focus lenses 202 rotate around the motor 208 as the motor 208 is driven by power supplied thereto. In an embodiment, lens axes of the focus lenses 202 are parallel to each other. In an embodiment, the arrangement of the focus lenses 202 is at an equal interval angle (e.g., $\pi/4$ radian when the number of focus lenses is eight). The focus length (and depth of field (DOF)) of each of the focus lenses 202 is fixed to a predetermined length (and depth), and therefore each of the focus lenses 202 has a certain range within which sharp images can be captured. The configuration of the DOF of the focus lenses is described below with reference to FIG. 3. Depending on a specific implementation of the embodiment, the number of focus lenses 202 may be a suitable number for driving situation of the assisted-driving vehicle.

In the example depicted in FIGS. 2A and 2B, the camera lens mount 204 is disposed at a 12 o'clock position. In an embodiment, the camera lens mount 204 includes one or more lenses 212 (see FIG. 2B), a diaphragm 214 (see FIG. 2B), an image sensor 216 (see FIG. 2B), and so on. The one or more lenses 212 may include an image stabilization lens that is mechanically movable in a plane crossing the lens axis direction, a distortion correction lens, and so on. Depending on a specific implementation of the embodiment, a suitable kind of lenses may be included in the one or more lenses 212, which include sphere lens, aspheric lens, diffractive lens, and so on. The diaphragm 214 is configured to adjust amount of light that reaches the image sensor 216. Depending on a specific implementation of the embodiment, a suitable type of diaphragm may be selected, which may include iris type, waterhouse type, a rotational type, and so on. Also, depending on a specific implementation of the embodiment, a suitable number of focus lenses 202 may be selected, which may be greater than or smaller than eight.

In the example depicted in FIG. 2B, the image sensor 216 is configured to sense intensity of light flux incident on each of image sensing pixels and generate image data based on the intensity of light flux incident on the image sensing pixels. In one embodiment, the image sensor 216 is configured to generate full-color (RGB) image data, having image sensing pixels corresponding each of RGB colors. In another embodiment, the image sensor 216 is further configured to generate infrared (IR) image data, having image sensing pixels corresponding to IR lights. Advantageously, IR image data is more capable of recognizing objects in a dark condition, e.g. at night, underground roads and in tunnels, compared to RGB image data. Also, the image sensor 216 may be of an suitable image sensing type, for example, an CMOS image sensing type and a CCD image sensing type. Depending on a specific implementation of the embodiment, a suitable number of the camera lens mount 204 included in a single focus-variable lens mount unit 200 may be determined. For example, the number of the camera lens mount 204 may be two, in which case the single focus-variable lens mount unit 200 is capable of capturing two image sequences at the same time, using two of the plurality of focus lenses 202. Further, depending on a specific implementation of the embodiment, a suitable position of the camera lens mount 204 may be determined. For example, positions of two camera lens mounts 204 may be at 3 o'clock position and 9 o'clock position.

In the example depicted in FIGS. 2A and 2B, the cleaning box 206 is disposed at a 6 o'clock position. The cleaning box 206 is configured to clean one or more surfaces of a focus lens 202 positioned at the cleaning box 206. That is, in the example of FIG. 2 A, the cleaning box 206 is configured to clean the focus lens 202e, which is not shown in FIG. 2A. As an assisted-driving vehicle drives on roads, foreign materials, such as oil, dust, rain drops, mud, bugs, and so on, may be attached to surfaces of the focus lenses, especially when the surface of the focus lenses 202 are communicating with the external environment (e.g., when an outer surface of the focus lenses 202 is exposed to the external environment). When the foreign materials are attached to the surfaces of the focus lenses 202, the foreign material may interfere with suitable image capturing for the assisted-driving. By cleaning one or more surfaces of the focus lenses 202 at the cleaning box 206, suitable image capturing can be maintained for longer time.

Depending on a specific implementation of the embodiment, a suitable manner of cleaning a target one of the focus lenses 202 (hereinafter referred to as a target focus lens) is determined for the cleaning box 206. For example, the cleaning box 206 may be configured to chemically clean the target focus lens. In more specific implementation of the embodiment, the cleaning box 206 may employ a surfactant suitable to remove oil component. In another more specific implementation of the embodiment, the cleaning box 206 may employ a superabsorbent polymer (SAP) to remove water. In another more specific implementation of the embodiment, the cleaning box 206 may employ water to remove water-solvent materials. In an embodiment, when the cleaning box 206 employs liquid to clean the target focus lens, the cleaning box 206 may discharge the liquid towards the target focus lens 202, or cause the target focus lens to be immersed into the liquid. Further, when liquid is employed to clean the target focus lens, the cleaning box 206 may further include a dryer to dry surface of the target focus lens, which may be wet after liquid cleaning. In one specific embodiment, the dryer may include an air blower and or an air heater.

In another embodiment, the cleaning box 206 may be configured to mechanically clean the target focus lens. In more specific implementation of the embodiment, the cleaning box 206 may inject gas towards the target focus lens to remove foreign materials thereon. In another more specific implementation of the embodiment, the cleaning box 206 may employ a wiper that moves on a surface of the target focus lens. Further, the wiper may include a wiper blade or a wiper cloth that travels along the surface of the target focus lens. In still another more specific implementation of the embodiment, the cleaning box 206 may peel off a thin film that is attached on a surface of the target focus lens in advance and on which foreign materials are formed.

In still another embodiment, the cleaning box 206 may be configured to electromagnetically clean the target focus lens. In more specific implementation of the embodiment, the cleaning box 206 may apply an electric field or an magnetic field to cause foreign materials on the target focus lens to be removed.

In still another embodiment, the cleaning box 206 may combine two or more of the cleaning processes described above. For example, the cleaning box 206 may discharge a detergent on a surface of the target focus lens while moving a wiper on the surface. For example, the cleaning box 206 may apply ultrasonic waves to the target focus lens while the target focus lens is immersed in water or other liquid.

In the example depicted in FIGS. 2A and 2B, the motor 208 is configured to rotate the focus lenses 202 via the shafts 210. Depending on a specific implementation of the embodiment, a suitable mechanism to rotate the focus lenses 202 can be employed for the motor 208. For example, the shafts 210 may be directly connected to a rotational axis of the motor 208. In another example, another intermediary mechanism that transfer rotational movement of the motor 208 to the focus lenses 202, such as belt(s), roller(s), gear(s), chains (s), and so on, may be employed. Further, depending on a specific implementation of the embodiment, a suitable type of the motor 208 is selected. The suitable type of the motor 208 may include a DC motor, brushless DC motor, stepper motor, induction motor (AC motor), and so on.

Depending on a specific implementation of the embodiment, a rotational direction of the motor 208 (i.e., a rotational direction of the focus lenses 202) may be fixed to a certain direction or variable. For example, the rotational direction of the motor 208 may be variable depending on a moving direction of the assisted-driving vehicle (e.g., a clockwise direction when the vehicle moves forward and a counterclockwise direction when the vehicle reverses). In a more specific implementation of the embodiment, the motors 208 of focus-variable lens mount units 200 positioned at a frond portion and/or rear portion of an assisted-driving vehicle may rotate in both directions, and the motors 208 of focus-variable lens mount units 200 positioned at left and right sides of the assisted-driving vehicle may rotate in only one directions. Since an object to be captured by the focus-variable lens mount unit 200 and distance to the object can more frequently change in the front and rear directions, compared to the left and right directions, more flexibility in the rotational directions of the motor 208 leads to faster change of a focus lens to a suitable one.

In the example depicted in FIGS. 2A and 2B, each of the shafts 210 connects corresponding one of the focus lenses 202 to the rotational axis of the motor 208. In an embodiment, the shaft 210 is directly coupled to the corresponding focus lens 202. In another embodiment, the shaft is coupled to a frame (not shown in FIG. 2A) in which the corresponding focus lens 202 is fit. Depending on a specific implementation of the embodiment, the shaft 210 is formed of a suitable material, which may be metal, resin, carbon fiber, and so on.

In the example depicted in FIG. 2B, the focus-variable lens mount unit 200 includes the focus lenses 202a and 202e, the camera lens mount 204, the cleaning box 206, the motor 208, the shafts 210, and a focus lens stabilizer 218. The focus-variable lens mount unit 200 depicted in FIG. 2B is covered by a body 230 of an assisted-driving vehicle, which has an aperture 232 at a position corresponding to the camera lens mount 204. Through the aperture 232, the focus lens 202a is exposed to an external environment, and the camera lens mount 204 is positioned behind the focus lens 202a.

In the example depicted in FIG. 2B, the focus lens stabilizer 218 is configured to stabilize a position of the focus lenses 202, in particular, one of the focus lenses 202 that is positioned at the camera lens mount 204. The focus-variable lens mount unit 200 tends to be subjected to vibration while the assisted-driving vehicle drives, typically caused by road surface unevenness or vibration of an engine or a motor to drive the vehicle. When a position of the focus lens 202 at the camera lens mount 204 is unstable, images captured by the image sensor 216 may contain image blur, which can reduce image recognition accuracy for assisted-driving. In order to stabilize the position of the focus lens 202 at the camera lens mount 204, the focus lens stabilizer 218 depicted in FIG. 2B restricts movement of the shaft 210 connected to the focus lens 202*a*. Depending on a specific implementation of the embodiment, the focus lens stabilizer 218 may be configured to be engaged with a suitable member of the focus-variable lens mount unit 200 to restrict movement of the focus lens 202*a*. For example, the focus lens stabilizer 218 may be configured to be directly engaged with the focus lens 202*a*. In another example, the focus lens stabilizer 218 may be configured to be directly engaged with a frame (not shown in FIG. 2B) of the focus lens 202*a*. Advantageously, when the focus lens 202*a* (or the frame thereof) is directly engaged with the focus lens stabilizer 218, movement of the focus lens 202*a* can be more securely restricted.

Depending on a specific implementation of the embodiment, a suitable mechanism to restrict movement of the focus lens 202*a* is employed. In more specific implementation of the embodiment, the focus lens stabilizer 218 may mechanically restrict movement of the focus lens 202*a*. For example, the focus lens stabilizer 218 includes a latch, e.g., a latch configured to be engaged with the shaft 210 connected to the focus lens 202*a*. In another example, the focus lens stabilizer 218 includes a pad that contacts with a member of the focus-variable lens mount unit 200, e.g., the shaft 210 connected to the focus lens 202*a* as shown in FIG. 2B. In another more specific implementation of the embodiment, the focus lens stabilizer 218 may electromagnetically restrict movement of the focus lens 202*a*. For example, the focus lens stabilizer 218 includes an electromagnet, e.g., an electromagnet configured to be engaged with a frame of the focus lens 202*a*. In still another more specific implementation of the embodiment, the focus lens stabilizer 218 may combine mechanical and electromagnetic restriction of movement of the focus lens 202*a*. Also, depending on a specific implementation of the embodiment, the motor 208 is caused to rotate only after the focus lens stabilizer 218 is released to allow rotation of the focus lenses 202*a*.

Advantageously, according to the example depicted in FIGS. 2A and 2B, the focus lenses 202 can be switched by rotation of a certain small angle (e.g., $\pi/4$ radian when the number of focus lenses 202 is eight). For that reason, the focus lenses 202 can be switched in a relatively shorter period of time, which is beneficial for use in an assisted-driving vehicle because an distance to an object to be captured can vary quickly and an object to be captured itself can vary frequently.

Figure 3:
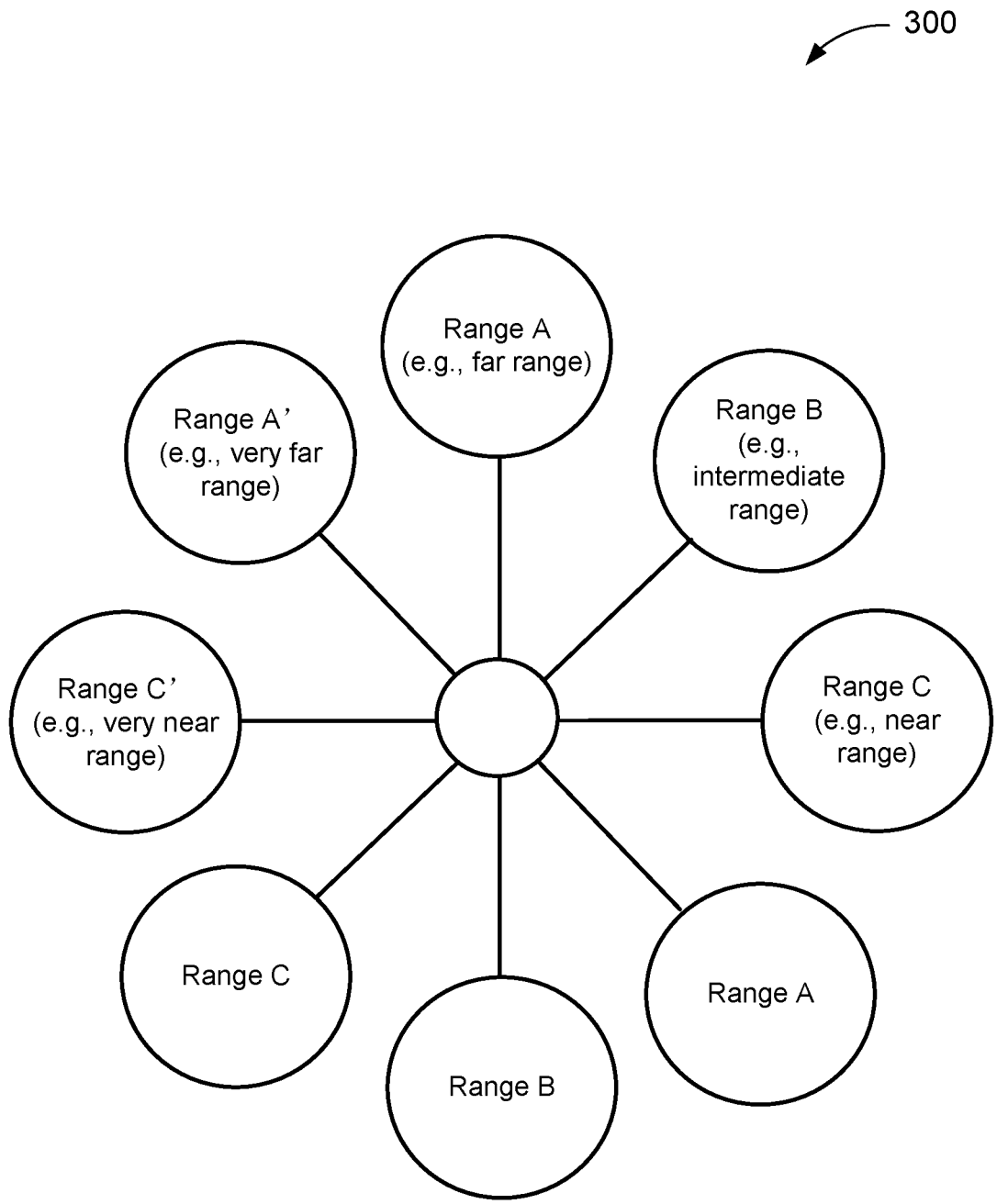
FIG. 3 is a schematic diagram depicting an example of arrangement of different types of focus lenses in a focus-variable lens mount unit according to an embodiment.

FIG. 3 is a schematic diagram depicting an example of arrangement of different types of focus lenses in a focus-variable lens mount unit 300 according to an embodiment. The focus-variable lens mount unit 300 depicted in FIG. 3 can correspond to one or more of the focus-variable lens mount units 102 depicted in FIG. 1 and the focus-variable lens mount unit 200 depicted in FIGS. 2A and 2B. In the example of FIG. 3, the focus-variable lens mount unit 300 includes eight focus lenses comprising five different focal lengths (different focal ranges). More specifically, the focus lenses included in the focus-variable lens mount unit 300 includes lenses of a long focal length for a far focal range A (e.g., 200-500 m), lenses of an intermediate focal length for an intermediate focal range B (e.g., 100-300 m), lenses of a short focal length for a near focal range C (e.g., 5-120 m), a lens of a very long focal length for a very far focal range A' (e.g., 400-1000 m), and a lens of a very short focal length for a very near focal range C' (e.g., 0.5-5 m).

In an embodiment, the lenses for the far focal range A may be suitable for capturing objects (e.g., signals, road signs, other vehicles, and obstacles) within the far focal range A, while an assisted-driving vehicle drives at a faster speed (e.g., 60-75 mph). In an embodiment, the lenses for the intermediate focal range B may be suitable for capturing the objects within the intermediate focal range B, while an assisted-driving vehicle drives at an intermediate speed (e.g., 35-60 mph). In an embodiment, the lenses for the near focal range C may be suitable for capturing the objects within the near focal range C, while an assisted-driving vehicle drives at a low speed (e.g., 10-35 mph). In an embodiment, the lens for the very far focal range A' may be suitable for capturing the objects within the very far focal range A', while an assisted-driving vehicle drives at a very fast speed (e.g., over 75 mph). In an embodiment, the lens for the very near focal range C' may be suitable for capturing the objects within the very near focal range C', while an assisted-driving vehicle drives at a very slow speed (e.g., less than 10 mph), in particular, when the assisted-driving vehicle is in a traffic or carrying out a parking. Depending on a specific implementation of the embodiment, a suitable number of lenses for each focal range may be prepared. For example, for a vehicle that is less likely to drive at a faster speed, e.g., a local transportation bus, the number of focus lenses for the near focal range C may be greater than the number of focus lenses for the far focal range A. In another example, for a vehicle that is more likely to drive at a faster speed, e.g., normal passenger vehicles, the number of focus lenses for the far focal range A may be greater than the number of focus lenses for the near focal range C. Depending on a specific implementation of the embodiment, the focus lens of different type have some overlap in the focal range. For example, in the above example, the far focal range A and the intermediate focal range B may have some overlap. In another example, the intermediate focal range B and the near focal range C B may have some overlap.

In the example of FIG. 3, the focus lenses are arranged in an order of A'-A-B-C-A-B-C-C' in terms of the focal ranges thereof. That is, the arrangement of the focus lenses includes a sub-arrangement of focus lenses in a descending or an ascending order of the focal ranges, such as A'-A-B-C and A-B-C-C', depending on a rotational direction of the focus lenses. Typically, when an assisted-driving vehicle drives in a forward direction, an object to be captured approaches the vehicle. For that reason, switching focus lenses in the order of A'-A-B-C (or A-B-C) in a continuous manner is suitable for following the object when the assisted-driving vehicle drives in the forward direction. Further, in the example of FIG. 3, the arrangement of the focus lenses includes repetition of the same sub-arrangement of focus lenses in a descending or an ascending order of the focal ranges, such as A-B-C and A-B-C, depending on a rotational direction of the focus lenses. Typically, in the situation where the assisted-driving vehicle drives in the forward direction, focus lenses are switched in an order of A-B-C as an object to be captured approaches the assisted-driving vehicle. Once the vehicle has passed the object to be captured, the vehicle may capture a next object that is approaching the vehicle.

For that reason, switching focus lenses in a repetitive manner is suitable for following objects that approaches sequentially. For example, when traffic signals, which are typically located on roads at some intervals (e.g., several ten meters to several hundred meters) are to be captured by the focus-variable lens mount unit 300, such an repetition of the same sub-arrangement of focus lenses is suitable to follow the traffic signals. Further, even if one focus lens is cleaned in a cleaning box (e.g., the cleaning box in FIG. 2A), another focus lens of the same focal length can be ready to be used for image capturing.

Figure 4A:
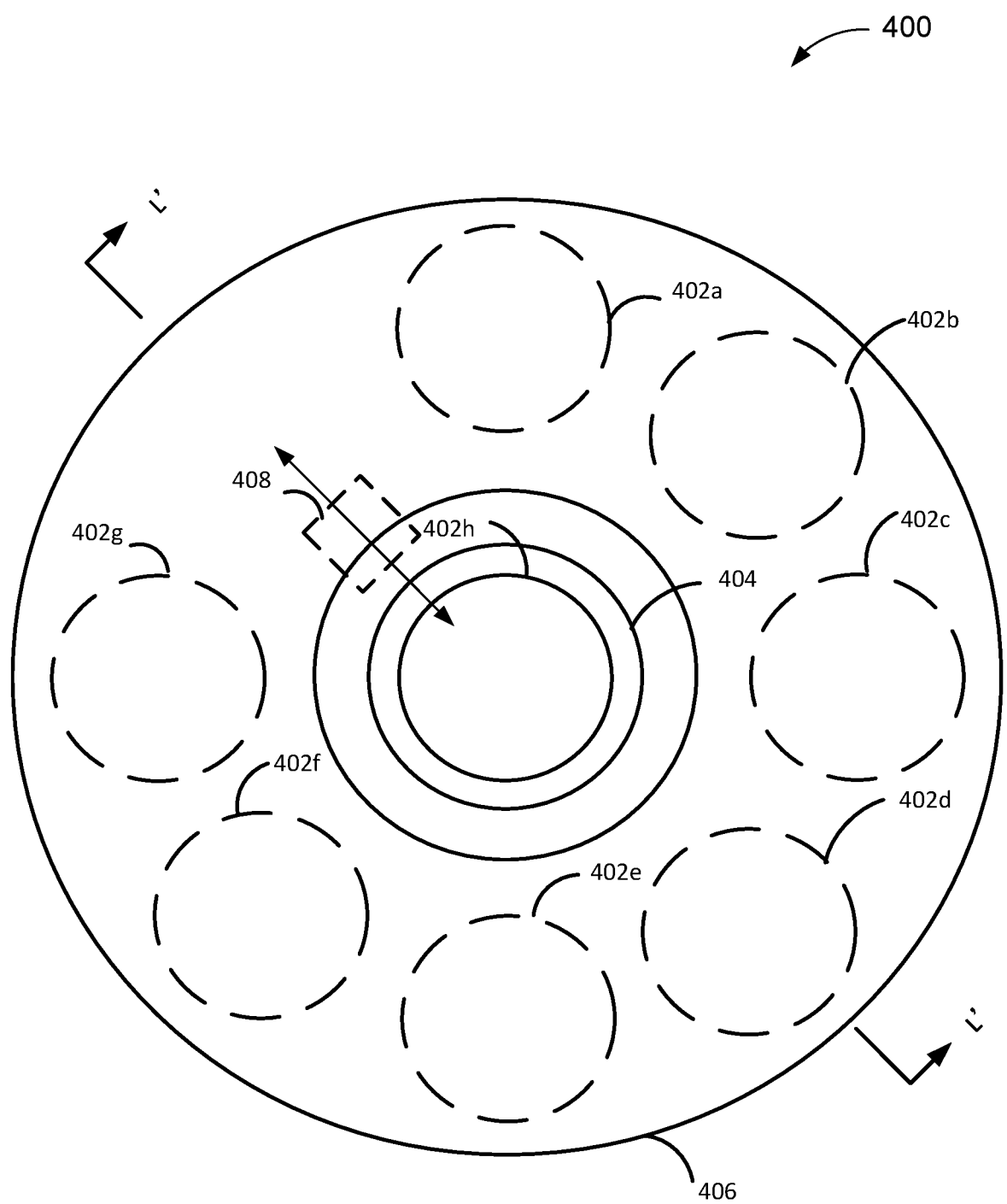
FIG. 4A is a schematic diagram depicting another example of a focus-variable lens mount unit in a direction parallel to lens axis directions of focus lenses included in the focus-variable lens mount unit according to an embodiment.
Figure 4B:
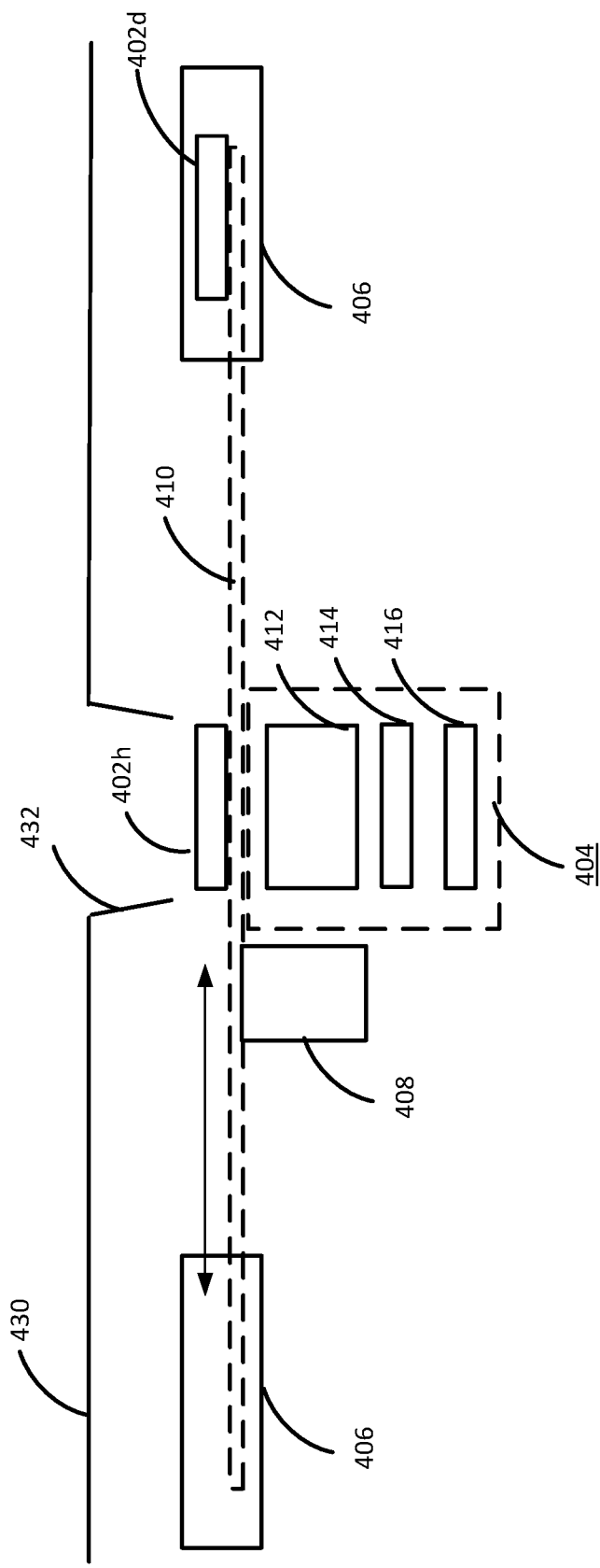
FIG. 4B is a schematic diagram depicting an example of the focus-variable lens mount unit taken along a line L'-L' depicted in FIG. 4A, in a direction perpendicular to the lens axis directions of the focus lenses.

FIG. 4 is a schematic diagram depicting an example of a focus-variable lens mount unit 400 in a direction parallel to lens axis directions of focus lenses included in the focus-variable lens mount unit 400 according to an embodiment. FIG. 4B is a schematic diagram depicting an example of the focus-variable lens mount unit 400 taken along a line L'-L' depicted in FIG. 4A, in a direction perpendicular to the lens axis directions of the focus lenses. The focus-variable lens mount unit 400 depicted in FIGS. 4A and 4B can correspond to one or more of the focus-variable lens mount units 102 depicted in FIG. 1. In the example depicted in FIG. 4A, the focus-variable lens mount unit 400 includes a plurality of focus lenses 402a-402h (hereinafter collectively referred to as focus lenses 402), a camera lens mount 404, a lens cleaner 406, an actuator 408, and guide rails 410. In FIG. 4A.

In the example depicted in FIGS. 4A and 4B, the focus lenses 402 are concentrically arranged around a center position, at which the camera lens mount 404 is positioned, and each of the focus lenses 402 is configured to move between the center position and an idle position at which the focus lens 402 is accommodated in the lens cleaner 406. The focus lenses 202 linearly moves along a corresponding guide rail 410 as the actuator 408 is driven by power supplied thereto. In one embodiment, the arrangement and configuration of the focus lenses 402 are substantially the same as the arrangement and the configuration of the focus lenses 202 depicted in FIGS. 2A and 2B.

In the example depicted in FIGS. 4A and 4B, the camera lens mount 404 is disposed at the center position. In an embodiment, the camera lens mount 404 includes one or more lenses 412 (see FIG. 4B), a diaphragm 414 (see FIG. 4B), an image sensor 416 (see FIG. 4B), and so on. Depending on a specific implementation of the embodiment, the configuration of the camera lens mount 404 may or may not be substantially the same as the camera lens mount 204 depicted in FIGS. 2A and 2B. In particular, each of the lenses 412, the diaphragm 414, and the image sensor 416 may or may not be configured in substantially the same manner as the lenses 212, the diaphragm 214, and the image sensor 216 depicted in FIG. 2B, respectively.

In the example depicted in FIGS. 4A and 4B, the lens cleaner 406 is concentrically disposed around the center position, and has a cylindrical shape with an opening at a center thereof. In the opening of the lens cleaner 406, one of the focus lenses 402 that is being used for image capturing and the camera lens mount 404 are exposed. The other of the focus lenses 402 that are not used for the image capturing are accommodated in the lens cleaner 406. The lens cleaner 406 is configured to clean one or more of the other of the focus lenses 402 that are not used for the image capturing, i.e., focus lenses 402 that are not positioned at the center. Depending on a specific implementation of the embodiment, a suitable manner of cleaning the focus lens 402 at the center can be employed. The manner may or may not be substantially the same as the cleaning manner of the cleaning box 206 depicted in FIGS. 2A and 2B.

In the example depicted in FIG. 4B, the focus-variable lens mount unit 400 depicted in FIG. 4B is covered by a body 430 of an assisted-driving vehicle, which has an aperture 432 at a position corresponding to the camera lens mount 404. Through the aperture 432, the focus lens 402h is exposed to an external environment, and the camera lens mount 404 is positioned behind the focus lens 402h.

In the example depicted in FIG. 4B, the actuator 408 is configured to move the focus lenses 402 along the guide rail 410. Depending on a specific implementation of the embodiment, a suitable mechanism to move each of the focus lenses 202 can be employed for the actuator 408. For example, the actuator 408 may be configured to move all of the focus lenses 402, In another example, the actuator 408 may be provided for each of the focus lenses 402, and each of the actuators may be configured to move corresponding one of the focus lenses 402. Also, depending on a specific implementation of the embodiment, the actuator 408 may or may not be mounted to each of the focus lenses 402. In an example, the actuator 408 is coupled to each of the focus lenses 202, such that each of the focus lenses 402 can drive along the corresponding guide rail 410. In another embodiment, the actuator 408 is coupled to the guide rail 410 so as to convey the corresponding focus lens 402. Further, depending on a specific implementation of the embodiment, the actuator 408 may or may not be configured in substantially a similar manner as the motor 208 depicted in FIGS. 2A and 2B. For example, the actuator 408 may be a linear motor disposed along the guide rail.

In the example depicted in FIG. 4B, the guide rail 410 may include a lens stabilizer (not shown in FIG. 4B) that has a configuration similar to the lens stabilizer 218 depicted in FIG. 2B. In one embodiment, the lens stabilizer at the guide rail 410 is positioned at the center position to stabilize the position of a focus lens 402 that is set to the center position for image capturing. Depending on a specific implementation of the embodiment, the guide rail 410 is formed of a suitable material, which may be metal, resin, carbon fiber, and so on.

Advantageously, according to the example depicted in FIGS. 4A and 4B, the focus lenses 402 do not necessarily arranged in the order of the focal length (or the focal range). Since one of the focus lenses 402 to be used for image capturing can be selected in an arbitrary order from the focus lenses 402, there is more flexibility of the arrangement of the focus lenses 402. Further, according to the lens cleaner 406 in the example depicted in FIGS. 4A and 4B, the focus lenses 402 that are not used for the image capturing are accommodated in the lens cleaner 406. Since relatively a larger number of focus lenses can be cleaned concurrently, it may be sufficient to use a smaller number of focus lenses having the same focal length (or the focal range), which allows for accommodation of focus lenses of more variety or more compact configuration of the focus-variable lens mount unit 400.

Figure 5:
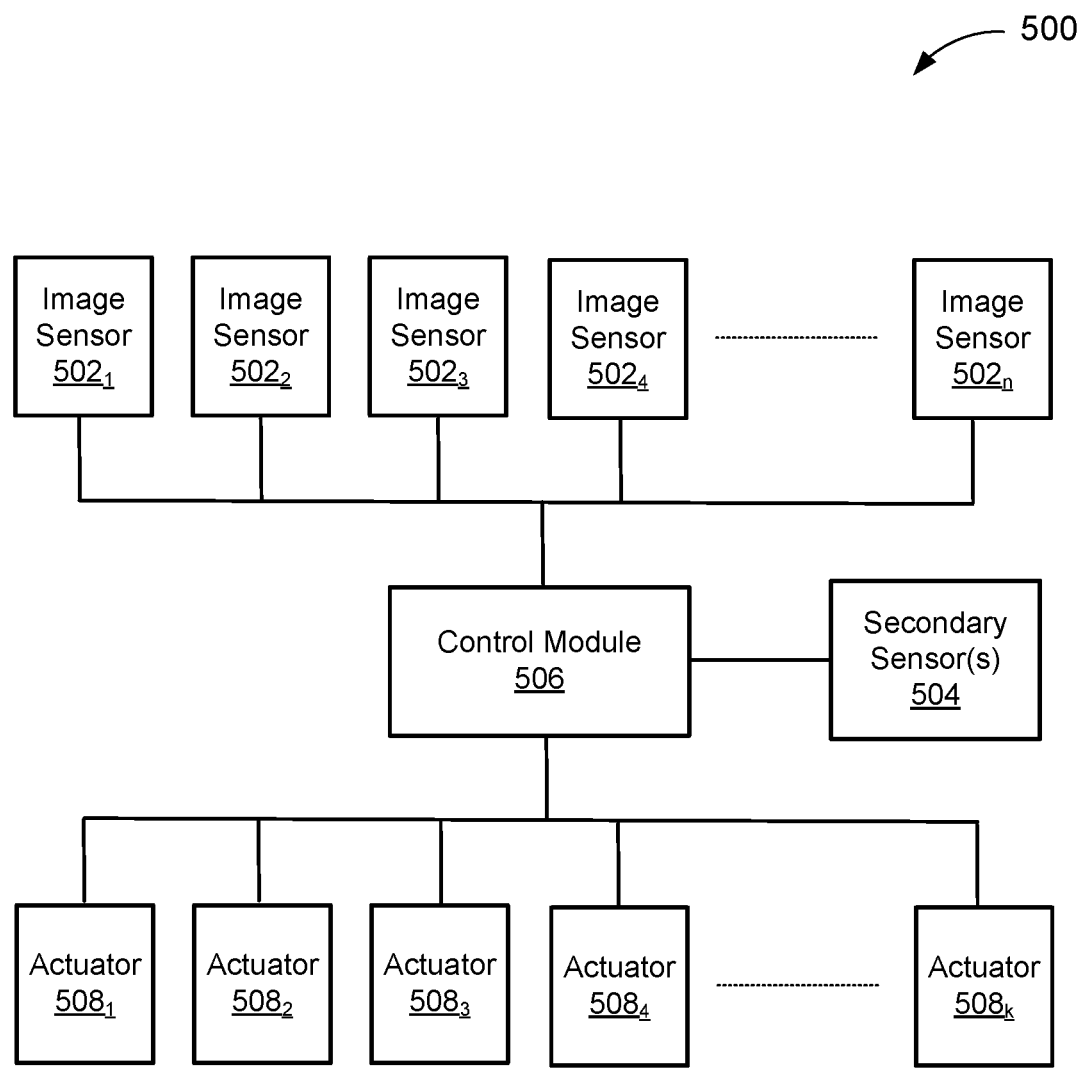
FIG. 5 is a schematic diagram depicting an example of a control system that is configured to control switching of focus lenses included in one or more focus-variable lens mount units according to an embodiment.

FIG. 5 is a schematic diagram depicting an example of a control system 500 that is configured to control switching of focus lenses included in one or more focus-variable lens mount units according to an embodiment. In the example of FIG. 5, the control system 500 includes a plurality of image sensors $502_1$-$502_n$ (hereinafter collectively referred to as image sensors 502), one or more secondary sensors 504, a control module 506, and a plurality of actuators $508_1$-$508_k$ (hereinafter collectively referred to as actuators 508). In the example of FIG. 5, each of the image sensors 502 is included in a focus-variable lens mount unit (e.g., the focus-variable lens mount unit 200 depicted in FIG. 2A), and can correspond to the image sensor 214 depicted in FIG. 2A. Each of the image sensors 502 is coupled with the control module 56, and configured to output image data obtained based on captured image to the control module 506. Although the image sensors 502 are directly coupled to each other in FIG. 5, the image sensors 502 may or may not be directly coupled to each other. Further, depending on a specific number of image sensors 402 included in each of a plurality of focus-variable lens mount units, the number of image sensors 502 may or may not be equal to the number of focus-variable lens mount units. For example, when each of the focus-variable lens mount units includes one image sensor, the number of image sensors 502 is equal to the number of the focus-variable lens mount units.

In the example of FIG. 5, the secondary sensor(s) 504 is coupled with the control module 406 and configured to output a non-image data to the control module 506. In an embodiment, the secondary sensor 504 includes a LiDAR sensor, which is a sensor configured to measure a distance to a target object by illuminating the target object with a pulsed laser light, and measuring the reflected pulses with a sensor. Based at least on a distance to a target object measured by the LiDAR sensor, switching of the focus lenses can be carried out. In another embodiment, the secondary sensor 404 includes an acceleration sensor configured to obtain an acceleration, a speed, a traveled distance of the assisted-driving vehicle. Based at least on the speed of the assisted-driving vehicle, a time period until a target object enters a specific distance range of the assisted-driving vehicle can be calculated, which can be used for the switching of the focus lenses. In still another embodiment, the secondary sensor 504 includes a global positioning system (GPS) sensor, which is a sensor configured to locate a global position of the assisted-driving vehicle. Based at least on the global position of the assisted-driving vehicle, a target object (e.g., a traffic signal, a speed bump, kids in a school zone) may be determined, which can be used for the switching of the focus lenses.

In the example of FIG. 5, the control module 506 is intended to represent hardware (e.g., processor, memory, etc.) configured to control one or more of the actuators 508 based on inputs from one or more of the image sensors 502 and inputs from the secondary sensor(s) 504. In one embodiment, the control module 506 includes a plurality of sub-modules that are coupled with each other, and each of the submodules is provided so as to correspond to one of the focus-variable lens mount units. For example, when the number of actuators 508 is k, (i.e., the number of the focus-variable lens mount units is k), the number of the submodules of the control module 506 may be k. The control module 506 is coupled to each of the actuators 508 and configured to control the actuators 508 based on a control signal output therefrom to the actuators 508. Depending on the specific implementation of the embodiment, the manner of transmission of the control signal is wired communication or wireless communication (e.g., IEEE 802.11 and IEEE 802.15.1).

In an embodiment, the control module 506 is configured to determine one or more target object to be followed based on the image data input from the image sensors 502. In a more specific implementation of the embodiment, the control module 506 employs an image recognition technique to identify objects (e.g., road lane boundaries, traffic signals, traffic signs, other vehicles, pedestrians, buildings around roads, sky, and so on) from images represented by the image data, extract objects (e.g., road lane boundaries, traffic signals, traffic signs, other vehicles, pedestrians, buildings around roads, and so on) that should be taken care of while driving, and select target object(s) (e.g., a vehicle immediately preceding the own vehicle) to be followed. Depending on a specific implementation of the embodiment, a suitable image recognition technique that is known to one of ordinary skills in the art may be employed.

In the example of FIG. 5, the actuators 508 are intended to represent mechanical or electrical component configured to cause the arrangement of the focus lenses to rotate. In one embodiment, one or more of the actuators 508 correspond to the motor 208 in FIG. 2A. In one embodiment, each of the actuators 508 is included in a different one of the focus-variable lens mount units, and therefore the number of the actuators 508 is equal to the number of the focus-variable lens mount units. Depending on a specific implementation of the embodiment, i.e., depending on the number of image sensors 502 included in each of the focus-variable lens mount units, the number of the actuators 508 may or may not be equal to the number of the image sensors 502. For example, when each focus-variable lens mount unit includes only one image sensor 502, the number of the actuators 508 can be equal to the number of the image sensors 502.

In an example operation, the system 500 such as is illustrated in FIG. 5 operates as follows. One or more of the image sensors 502 generates image data based on captured images within its angle of view (AoV) and outputs the image data to the control module 506, the secondary sensor 504 measures a corresponding environmental metric and output measured environmental metric data to the control module 506. The control module 506 generates control signals based on the image data input from one or more of the image sensors 502 and the measured metric input from the secondary sensor 504, and output the control signals to one or more of the actuators 508. The one or more actuators 508 that have received the control signals are caused to rotate the arrangement of the focus lenses such that a suitable focus lens is positioned at a corresponding image sensor.

Figure 6:
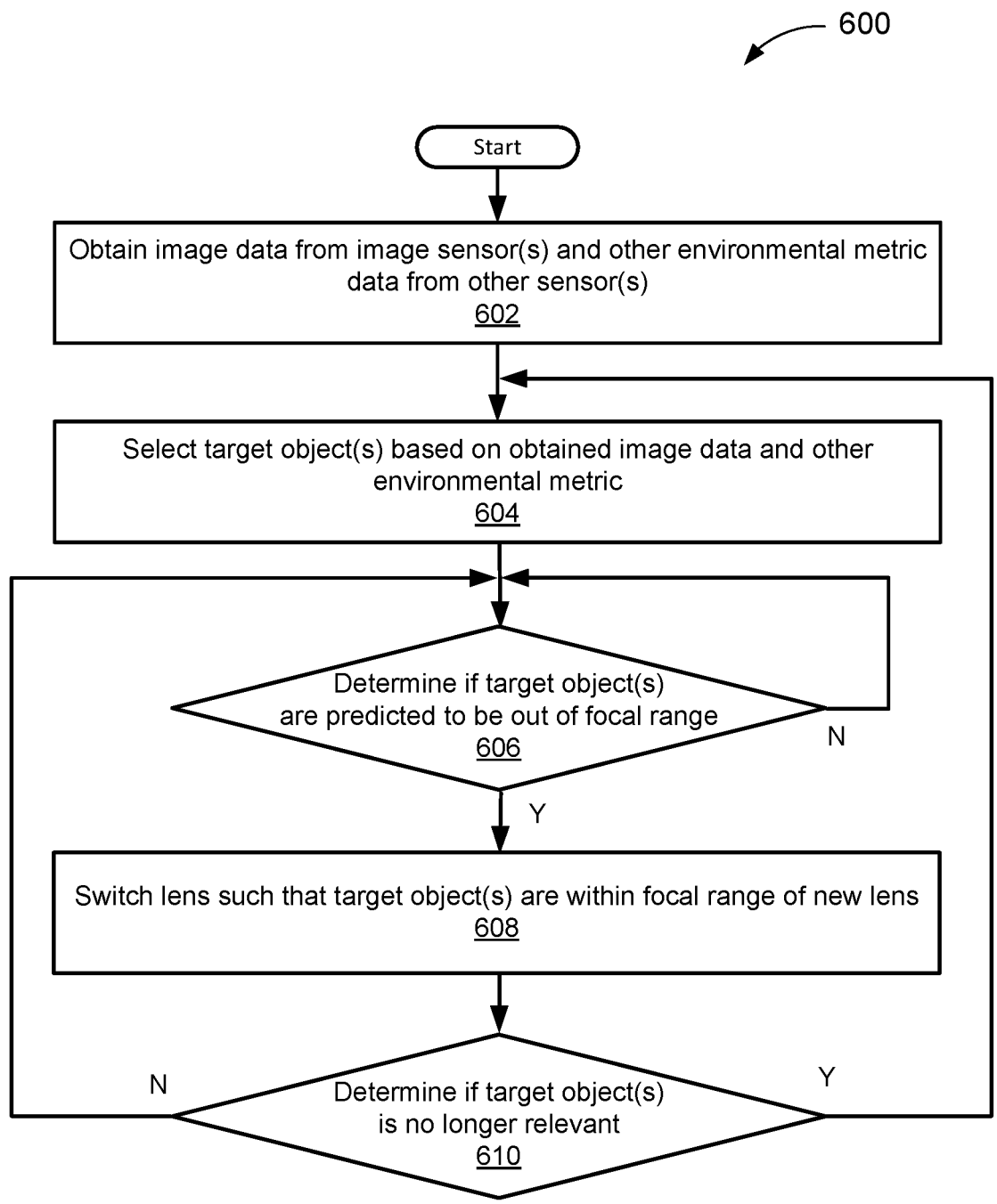
FIG. 6 is a flowchart of an example of a method for controlling an actuator of a focus-variable lens mount unit according to an embodiment.

FIG. 6 is a flowchart 600 of an example of a method for controlling an actuator of a focus-variable lens mount unit according to an embodiment. This flowchart is organized in a fashion that is conductive to understanding. It should be recognized, however, that the modules can be reorganized for parallel execution, reordered, modified (changed, removed, or augmented), where circumstances permit. The flowchart 600 starts at module 602, where image data are obtained from one or more of image sensors, and other environmental metric are obtained from secondary sensor(s).

In the example of FIG. 6, the flowchart 600 continues to module 604, where target object(s) are selected based on obtained image data and other environmental metric data. In a specific implementation, in accordance with an object recognition technique, objects included in images represented by the obtained image data are identified, and some of the identified objects are extracted as object to be taken care of for assisted-driving. Thereafter, based on the other environmental metric data, such as distance data indicating distance to objects, speed data indicating speed of the assisted-driving vehicle, and GPS data indicating a global position of the assisted-driving vehicle, in combination with the extracted objects, one or more target objects to be followed are selected.

In the example of FIG. 6, the flowchart 600 continues to decision point 606, where it is determined whether the target object(s) are predicted to be out of the focal range of the current focal lens that is positioned at the corresponding camera lens mount (i.e., used for image capturing), for example, in a predetermined time window (e.g., 1 sec). In a specific implementation, the decision point 606 is carried out based on the image data obtained from one or more of the image sensors and the other environmental metric obtained from the secondary sensor(s). The decision point 606 is repeated with a predetermined time interval, until the decision result of the decision point 606 becomes Yes (Y in FIG. 6). In other words, the focus lens is not changed if the decision result of the decision point 606 is No (N in FIG. 6).

In the example of FIG. 6, if the decision result of the decision point 606 is Yes (Y in FIG. 6), the flowchart 600 continues to module 608, where a focus lens of the focus-variable lens mount unit that is used for image capturing for the assisted-driving is switched to one that is suitable for image capturing of the target object (i.e., within the focal range of the new focus lens) at the time after the predetermined time window (e.g., 1 sec). In a specific implementation, when a target object is at a distance of 210 m from the assisted-driving vehicle and predicted to be out of a focal range of a current lens (e.g., a focal lens having a focal range of 200-500 m, or the focus lens of the range A in FIG. 3) within a predetermined time window (e.g., 1 sec) based on a current speed of the vehicle, the focus lens to be used is switched to the one having a focal range including a predicted distance (e.g., 200 m) of the target object after the predetermined time window (e.g., a focal lens having a focal range of 100-300 m, or the focus lens of the range B in FIG. 3).

In a specific implementation, the arrangement of the focus lenses in the focus-variable lens mount unit is configured such that the adjacent lens matches the predicted distance of the target object. In such a case, the switching of the focus lens requires switching to the adjacent focus lens to the current one. Further, in a specific implementation, the predetermined time window may be adjusted based on the speed of the assisted-driving vehicle. For example, as the speed of the assisted-driving vehicle increases, the predetermined time window may be decreased, such that the predicted position of the target object is within the focal range of the adjacent focus lens. In more particular implementation, the predetermined time window is set to 1 sec when the speed of the vehicle is 40-50 mph, and the predetermined window is set to 0.8 sec when the speed of the vehicle is 50-60 mph. In another particular implementation, the predetermined time window may be decreased linearly, in accordance with increase of the speed of the vehicle.

In the example of FIG. 6, the flowchart 600 continues to decision point 610, where it is determined whether or not the target object(s) is no longer relevant for the assisted-driving, e.g., the assisted-driving vehicle has passed the target object. In a specific implementation, the decision point 610 is carried out based on whether or not the target object is within the AoV of the focus-variable lens mount unit. In another specific implementation, the decision point 610 is carried out based on comparison of a calculated position of the target object with respect to a current position of the assisted-driving vehicle, which can be obtained based on GPS signals or data from acceleration sensors. If the decision result of the decision point 610 is Yes (Y in FIG. 6), the flowchart 600 returns to the module 604, where a new target object is selected. If the decision result of the decision point 610 is No (N in FIG. 6), the flowchart 600 returns to the module 506. The above sequence of processes starts to be carried out upon activation (e.g. power on) of the focus-variable lens mount unit and continues to be carried out until deactivation (e.g., power off) of the focus-variable lens mount unit. In a specific implementation, the activation and/or deactivation of the focus-variable lens mount unit may be synchronized with engine start and/or stop (or power on and/or off) of the assisted-driving vehicle.

Figure 7:
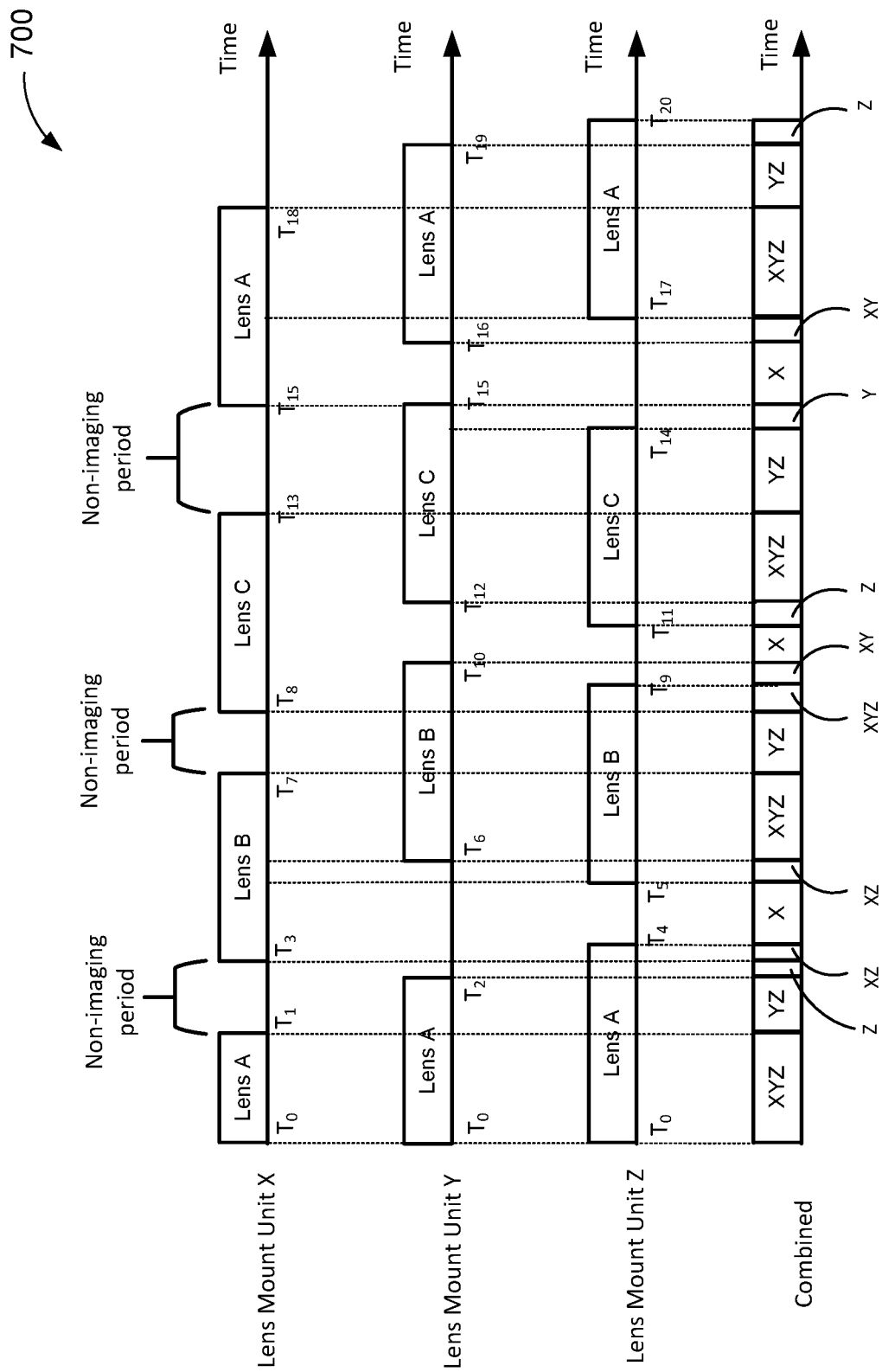
FIG. 7 is a time chart of an example of a method for controlling actuators of a plurality of focus-variable lens mount units according to an embodiment.

FIG. 7 is a time chart 700 of an example of a method for controlling actuators of a plurality of focus-variable lens mount units according to an embodiment. In a focus-variable lens mount unit, image capturing may not be properly carried out when a focus lens is switched from a current one to a new one, because no focus lens may be positioned at a camera lens mount having an image sensor. According to an embodiment, when a plurality of focus-variable lens mount units is provided redundantly, such that at least one of the focus-variable lens mount units can carry out image capturing while the other one of the focus-variable lens mount units switches its focus lens, by shifting the timing to switch the focus lens each other. FIG. 7 depicts, in the top three rows, an example of timing to switch focus lenses where three focus-variable lens mount units (lens mount units X, Y, and Z) are configured to capture images of an object, e.g., the three focus-variable lens mount units (i.e., lens axis thereof) are directed to the same direction (e.g., forward direction), while an assisted-driving vehicle drives in a forward direction between time $T_0$ and Tao. FIG. 7 also depicts a time chart indicating identifiers of lens mount units that are image-capturing in each time period at the bottom row.

In the example of FIG. 7, each of the focus-variable lens mount units X, Y, Z has at least three different types of focus lenses: lens A having a far focal range, lens B having an intermediate focal range, lens C having a near focal range. In the example of FIG. 7, the focus-variable lens mount unit X uses the lens A from time $T_0$ to time $T_1$, switches the lens A to the lens B from time $T_1$ to time $T_3$, uses the lens B from time $T_3$ to time $T_7$, switches the lens B to the lens C from time $T_7$ to time $T_8$, uses the lens C from time $T_8$ to time $T_{13}$, switches the lens C to the lens A from time $T_{13}$ to time $T_{15}$, and uses the lens A from time $T_{15}$ to time $T_{18}$. In the example of FIG. 7, the focus-variable lens mount unit Y uses the lens A from time $T_0$ to time $T_2$, switches the lens A to the lens B from time $T_2$ to time $T_6$, uses the lens B from time $T_6$ to time $T_{10}$, switches the lens B to the lens C from time $T_{10}$ to time $T_{12}$, uses the lens C from time $T_{12}$ to time $T_{15}$, switches the lens C to the lens A from time $T_{15}$ to time $T_{16}$, and uses the lens A from time $T_{16}$ to time $T_{19}$. In the example of FIG. 7, the focus-variable lens mount unit Z uses the lens A from time $T_0$ to time $T_4$, switches the lens A to the lens B from time $T_4$ to time $T_5$, uses the lens B from time $T_5$ to time $T_9$, switches the lens B to the lens C from time $T_9$ to time $T_{11}$, uses the lens C from time $T_{11}$ to time $T_{14}$, switches the lens C to the lens A from time $T_{14}$ to time $T_{17}$, and uses the lens A from time $T_{17}$ to time $T_{20}$.

According to the example of FIG. 7, from time $T_0$ to time Tao, at least one of the focus lens of the three focus-variable lens mount units X, Y, Z properly carries out image capturing of an object. In other words, there is no blanc period during which no image capturing of the object is carried out. For example, from time $T_1$ to time $T_3$, during which the focus-variable lens mount unit X is switching the focus lens from the lens A to the lens B, the lens A of the focus-variable lens mount unit Y is used for image capturing from time $T_1$ to time $T_2$, and the lenses A of the focus-variable lens mount units Y and Z are used for image capturing from time $T_2$ to time $T_3$. In another example, from time $T_{13}$ to time $T_{15}$, during which the focus-variable lens mount unit X is switching the focus lens from the lens C to the lens A, the lenses C of the focus-variable lens mount units Y and Z are used for image capturing from time $T_{13}$ to time $T_{15}$, and the lens C of the focus-variable lens mount unit Y is used for image capturing from time $T_{14}$ to time $T_{15}$. Advantageously, since there is no blank period of image capturing, more accurate and more safe operation of the safe-driving can be carried out.

It is noted that the timing (e.g., time $T_1$, $T_2$, and $T_4$) to switch the same focus lens (e.g., the lens A) is different among the three focus-variable lens mount units X, Y, Z. In an embodiment, this timing difference can be caused at least partially by differentiating the predetermined time window (described above in module 606 of FIG. 6) among the three focus-variable lens mount units X, Y, Z. For example, with respect to a speed of 40 mph, the predetermined time window for the focus-variable lens mount unit X is set to 0.6 sec, the predetermined time window for the focus-variable lens mount unit Y is set to 0.8 sec, and the predetermined time window for the focus-variable lens mount unit Y is set to 1.0 sec, such that the lenses A of the units X, Y, and Z are switched to the lenses B in this order. In another embodiment, this timing difference can be caused at least partially by differentiating the focal range of each type of focus lens among the three focus-variable lens mount units X, Y, Z. For example, the focal range of the lens A for the unit X is set to 200-500 m, the focal range of the lens A (more accurately lens A') for the unit Y is set to 190-480 m, and the focal range of the lens A (more accurately lens A") for the unit Z is set to 180-460 m.

Figure 8:
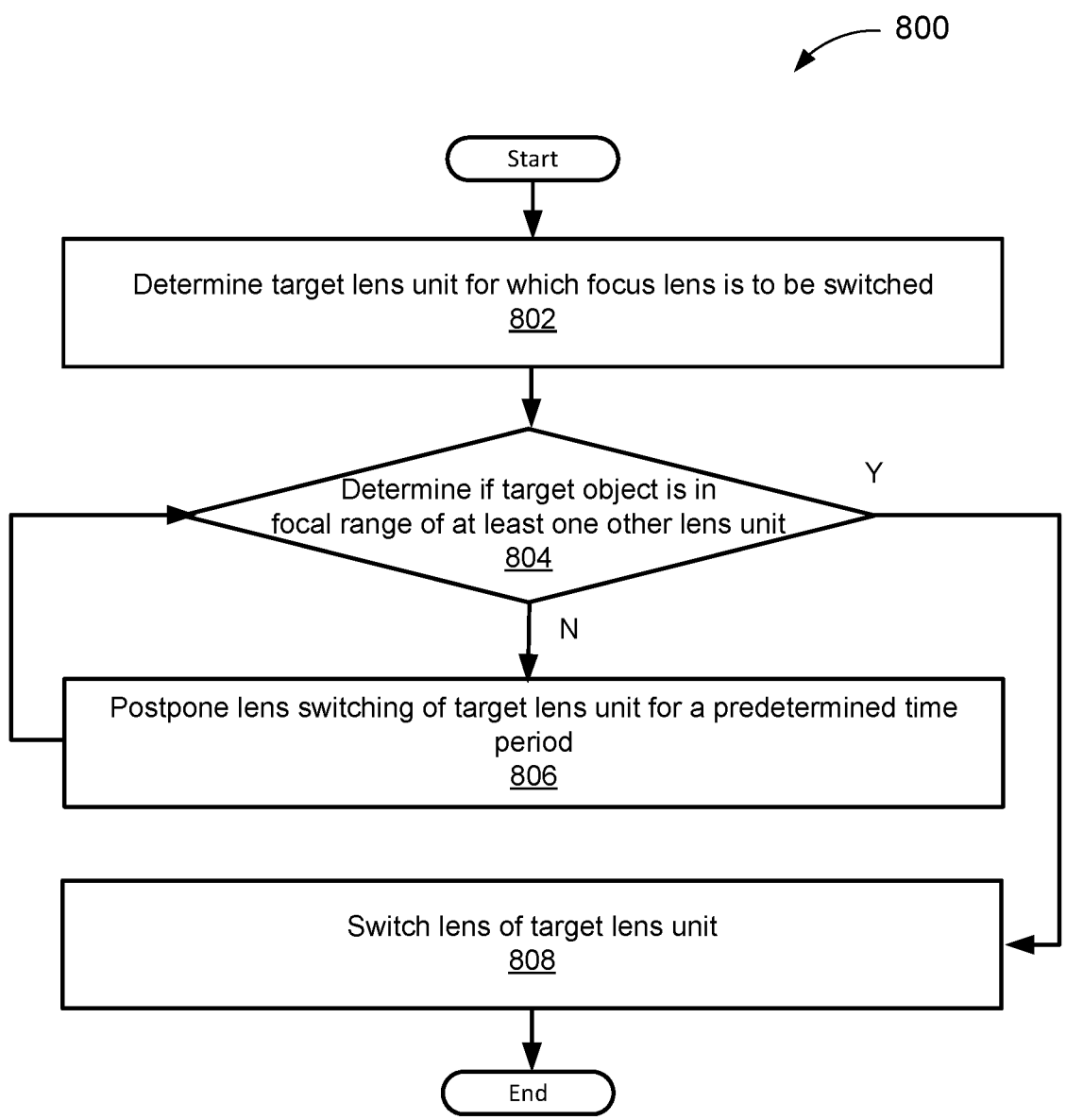
FIG. 8 is a flowchart of an example of a method for controlling actuators of a plurality of focus-variable lens mount units according to an embodiment.

FIG. 8 is a flowchart 800 of an example of a method for controlling actuators of a plurality of focus-variable lens mount units according to an embodiment. The flowchart 800 starts at module 802, where a target focus-variable lens mount unit for which a focus lens is to be switched is determined. In one embodiment, the module 802 may include submodules corresponding to the modules 602-606 depicted in FIG. 6.

In the example of FIG. 8, the flowchart 800 continues to decision point 804, where it is determined whether or not a target object followed by the plurality of focus-variable lens mount units is in a focal range of a current focal lens that is being used by at least one of the other focus-variable lens mount units different from the target focus-variable lens mount unit. In an embodiment, the decision point 804 can be carried out by determining whether or not at least two of the focus-variable lens mount unit set a focal lens for image capturing (i.e., do not switching focus lenses), assuming that the method 600 depicted in FIG. 6 is being carried out. In other words, if all of the other focus-variable lens mount units different from the target focus-variable lens mount unit are switching their focus lens, the decision result of the decision point 804 would be No; otherwise, the decision result of the decision point 804 would be Yes.

In the example of FIG. 8, if the decision result of the decision point 804 is No (N in FIG. 8), the flowchart 800 continues to module 806, where switching of the focus lens of the target focus-variable lens mount unit is postponed for a predetermined time period and the flowchart 800 returns to the decision point 804. In an embodiment, the predetermined time period is set to a time period (e.g., 0.3 sec) that requires switching of a focus lens to its adjacent focus lens in an arrangement of a plurality of focus lenses in a focus-variable lens mount unit.

In the example of FIG. 8, if the decision result of the decision point 804 is Yes (Y in FIG. 8), the flowchart 800 continues to module 808, where the current focus lens that is being used by the target focus-variable lens mount unit is switched to a new one. In a specific embodiment, the focus lens is switched by causing the arrangement of the focus lenses to rotate.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A lens mount apparatus mountable on a vehicle, comprising:
   a plurality of lenses concentrically arranged around a center and coupled to the center through a plurality of respective shafts, the plurality of lenses comprising a plurality of respective focal lengths;
   an actuator configured to cause a first lens of the plurality of lenses to move to a position to obtain image data;
   an image sensor disposed at the position to obtain the image data using the first lens or other lenses of the plurality of lenses; and
   a lens cleaner disposed along a concentric arc associated with the arrangement of the plurality of lenses and radially with respect to the center, and configured to clean surfaces of at least one lens of the plurality of lenses while the first lens actuates to the position to obtain the image data.

2. The lens mount apparatus of claim 1, wherein the position to obtain the image data is at the center, the at least one lens of the plurality of lenses is the first lens, and the actuator causes the plurality of lenses to move linearly to the center.

3. The lens mount apparatus of claim 1, further comprising a controller configured to control, based on the image data obtained by the image sensor, the actuator to switch a lens positioned at the position to obtain the image data to another lens as a relative distance of an object within an angle of view of the lens mount apparatus changes.

4. The lens mount apparatus of claim 1, wherein the position to obtain the image data is located along the concentric arc associated with the plurality of lenses and radially with respect to the center, and the actuator is configured to rotate the plurality of lenses around the center.

5. The lens mount apparatus of claim 4, wherein the plurality of lenses comprises the first lens having a first focal length, a second lens having a second focal length that is shorter than the first focal length, a third lens having a third focal length that is shorter than the second focal length, and wherein the first lens, the second lens, and the third lens are consecutively arranged along a rotational direction.

6. The lens mount apparatus of claim 5, wherein the plurality of lenses comprises a plurality of subgroups of lenses, and each of the subgroups of lenses comprises the first lens, the second lens, and the third lens that are consecutively arranged along the rotational direction.

7. The lens mount apparatus of claim 2, wherein the position to obtain the image data is nonconcentric with the plurality of lenses, and the actuator is configured to move the plurality of lenses such that at least one of the plurality of lenses is not concentrically arranged around the center.

8. The lens mount apparatus of claim 1, further comprising a plurality of lens stabilizers disposed along the plurality of respective shafts and configured to mechanically and electromagnetically restrict vibrations induced by the vehicle to the plurality of lenses.

9. The lens mount apparatus of claim 8, wherein the plurality of lens stabilizers comprises a latch positioned to prevent a movement of an element of the lens mount apparatus by the actuator.

10. A method of controlling a lens mount apparatus mounted on a vehicle, the method comprising:
   positioning a first lens of a plurality of lenses at a position to obtain image data, wherein the first lens has a first focal length;
   obtaining the image data from an image sensor through the first lens of the plurality of lenses;
   identifying a target object based on the image data, wherein the target object is within an angle of view of the lens mount apparatus and is at a first distance from the lens mount apparatus;
   determining whether or not the target object is predicted to be closer to the lens mount apparatus than the first focal length of the first lens after a predetermined period of time; and
   upon determining that the target object is predicted to be closer to the lens mount apparatus than the first focal length of the first lens after the predetermined period of time, positioning a second lens of the plurality of lenses having a second focal length shorter than the first focal length at the position to obtain the image data in place of the first lens.

11. The method of claim 10, further comprising:
   when the second lens is at the position for to obtain the image data, determining whether or not the target object is outside of the angle of view of the lens mount apparatus; and
   upon determining that the target object is outside of the angle of view of the lens mount apparatus, positioning a third lens of the plurality of lenses having a third focal length shorter than the second focal length at the position to obtain the image data in place of the second lens.

12. The method of claim 10, wherein the plurality of lenses is concentrically arranged around a center, the position to obtain the image data is located along a concentric arc associated with the plurality of lenses, and wherein positioning the first lens at the position to obtain the image data comprises rotating the plurality of lenses about a center.

13. The method of claim 12, further comprising:
   cleaning at least one lens of the plurality of lenses at a second position along the concentric arc as the plurality of lenses rotate about the center, wherein the second position and the position to obtain the image data are different along the concentric arc.

14. The method of claim 10, wherein the plurality of lenses is concentrically arranged around a center, the position to obtain the image data is at the center, and wherein positioning the first lens at the position to obtain the image data comprises linearly moving the first lens of the plurality of lenses to the center from a concentric position along the concentric arrangement.

15. The method of claim 14, further comprising cleaning a lens of the plurality of lenses as the lens moves back from the center to the concentric position along the concentric arrangement.

16. The method of claim 10, further comprising restricting a movement of the plurality of lenses such that a lens of the plurality of lenses is stably positioned at the position to obtain the image data.

17. The method of claim 13, wherein the second position is offset 180 degrees from the position to obtain the image data.

18. The lens mount apparatus of claim 1, wherein the lens cleanser is:
   disposed 180 degrees from the position to obtain the image data along the concentric arc associated with the arrangement of the plurality of lenses;
   configured to clean the surfaces by applying ultrasonic waves while immersing the surfaces using a type of cleaner selected based on a type of material to be removed on the surfaces, the type of cleaner comprising:
      a surfactant in response to the type of material being an oil;
      a superabsorbent polymer in response to the type of material being water; and
      water in response to the type of material being a water-solvent material; and
   configured to dry the surfaces after the cleaning.

19. The lens mount apparatus of claim 1, wherein the lens cleanser is configured to peel off a preattached film on which foreign materials are formed, or apply an electric field or a magnetic field to cause foreign materials to be removed.

20. The lens mount apparatus of claim 3, wherein the controller is configured to control the actuator to switch a lens by rotating any of the lens or the another lens by an angle, and determine a time to switch the lens based on an acceleration and a speed of the vehicle.

* * * * *